United States Patent [19]
Moore et al.

[11] Patent Number: 4,917,875
[45] Date of Patent: Apr. 17, 1990

[54] GAS/SOLID CONTACT METHOD FOR REMOVING SULFUR OXIDES FROM GASES

[75] Inventors: Andrew S. Moore, North Brunswick; David B. Bartholic, Watchung; Dwight F. Barger, High Bridge; William J. Reagan, Englishtown, all of N.J.

[73] Assignee: Englehard Corporation, Edison, N.J.

[21] Appl. No.: 214,915

[22] Filed: Jun. 29, 1988

Related U.S. Application Data

[63] Continuation of Ser. No. 866,670, May 27, 1986, abandoned.

[51] Int. Cl.[4] .......................... B01J 8/00; C01B 17/00; B01D 53/02
[52] U.S. Cl. ........................................ 423/244; 55/73; 55/74; 423/DIG. 16
[58] Field of Search ...... 423/244 A, 244 R, DIG. 16; 55/352, 73, 74

[56] References Cited

U.S. PATENT DOCUMENTS

| | | | |
|---|---|---|---|
| 4,001,375 | 1/1977 | Longo | 423/244 R |
| 4,157,375 | 1/1979 | Brown et al. | 502/68 |
| 4,274,942 | 6/1981 | Bartholic et al. | 423/244 R |
| 4,284,494 | 8/1981 | Bartholic et al. | 423/244 R |
| 4,325,811 | 4/1982 | Sorrentino | 423/244 R |
| 4,332,672 | 6/1982 | Blanton et al. | 208/120 |
| 4,346,063 | 8/1982 | Cahn et al. | 423/244 R |
| 4,369,108 | 1/1983 | Bertolacini et al. | 423/244 R |
| 4,423,019 | 12/1983 | Bertolacini et al. | 423/244 R |
| 4,548,797 | 10/1985 | Sauer et al. | 423/240 |
| 4,562,054 | 12/1985 | Bhatia | 423/244 A |
| 4,589,978 | 5/1986 | Green et al. | 423/244 R |

OTHER PUBLICATIONS

Perry, Chemical Engineers' Handbook 5th edition, pp. 20-103.
Turbulent Fluid Bed Reactors Using Fine Powder Catalysts Amos Aviden, Sep. 20-22, 1982.
Fluidized Bed Processing, Reh, Chemical Engineering Progress, vol. 67, No. 2, Feb. 1971.
"Petroleum Processing", Hengstebeck, McGraw Hill (1959), pp. 106-107.

Primary Examiner—Robert L. Stoll
Assistant Examiner—Lori F. Cuomo
Attorney, Agent, or Firm—Inez L. Moselle

[57] ABSTRACT

An improved continuous cyclic process for removing oxides of sulfur from a waste gas with a regenerable particulate adsorbent in which hot adsorbent particles pick up SOx in a first fluid transport riser, followed by separation of clean gas from sulfur-contained particles which are then recycled to a desorber in which they are contacted at elevated temperature with a mixture of reducing gas and water vapor for release of sulfur as hydrogen sulfide. The adsorbent particles are then recycled in the process. Means are provided for removing particulates in the waste gas.

20 Claims, 1 Drawing Sheet

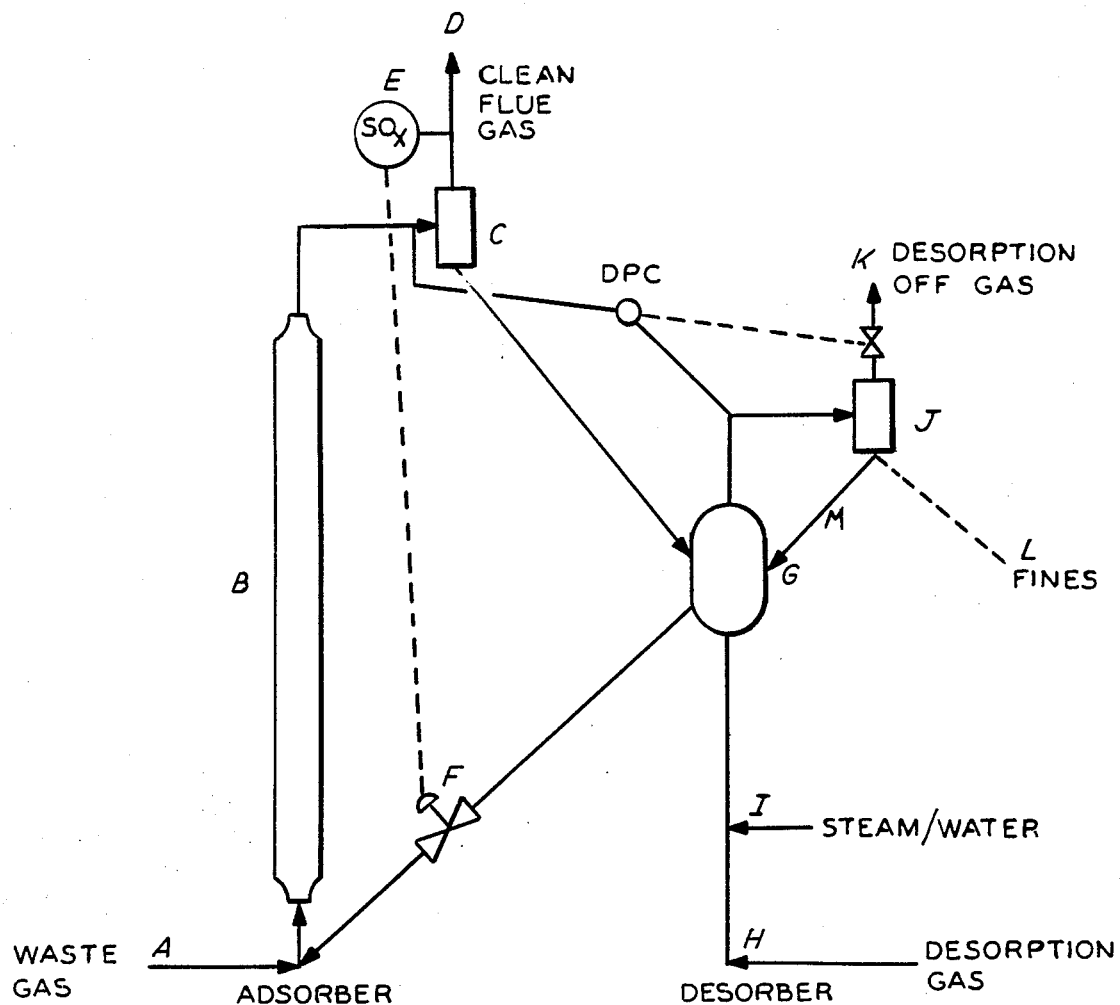

GAS/SOLID CONTACT METHOD FOR REMOVING SULFUR OXIDES FROM GASES

This is a continuation of co-pending application Ser. No. 866,670, filed on May 27, 1986, now abandoned.

FIELD OF THE INVENTION

This invention relates to a continuous cyclic process for efficiently removing sulfur oxides (SOx) from waste gases with a regenerable adsorbent and a means of regenerating the adsorbent. The process features contact of the waste gas with a fluidizable regenerable sorbent in a progressive flow type adsorber having an elongated chamber (riser) and release of the adsorbed oxides in the form of hydrogen sulfide by contact with a reducing gas mixed with water vapor.

RELATED APPLICATIONS

This application is reated to Ser. No. 804,871, filed Dec. 5 1985; Ser. No. 831,907, filed Feb. 24, 1986, now abandoned; Ser. No. 831,906, filed Feb. 24, 1986, now abandoned ; Ser. No. 831,905, filed Feb. 24, 1986, now abandoned; Ser. No. 831,904, filed Feb. 24, 1986, now U.S. Pat. No. 4,724,065; and Ser. No. 839,319, filed Mar. 13, 1986, now U.S. Pat. No. 4,693,809; in the names of David Bartholic and Dwight Barger. This application is also related to Ser. No. 06/866,814 "IMPROVED METHOD FOR REMOVING SULFUR OXIDES FROM FLUE GASES OF FCC UNITS", filed concurrently herewith.

BACKGROUND OF THE INVENTION

A necessary and integral part of a fluid catalytic cracking reactor involves the regenerator wherein the spent catalyst has its activity restored. Regeneration of spent catalyst is generally effected after separation of the spent catalyst from the reaction products. The spent catalyst is removed from the reaction zone and contacted in a stripping zone with a stripping medium, usually steam, to remove vaporized and entrained and/or occluded hydrocarbons from the catalyst. From the stripping zone, a stripped catalyst is passed into a regeneration zone wherein the stripped spent catalyst is regenerated by burning coke deposits therefrom with an oxygen-containing gas, usually air. The resulting hot regenerated catalyst from the egeneration zone is then recycled to the reaction zone in contact with additional hydrocarbon feed. When the hydrocarbon feed to the fluid catalytic cracking reactor riser contains sulfur, oxides of sulfur report in the flue gas from the regenerator, creating a noxious gas stream unless the feed is low in sulfur. A similar problem of sulfur oxide emissions resulting from regeneration of spent solid contact material by burning occurs in the operation of fluid cokers or selective vaporization processes of the type described in U.S. Pat. No. 4,263,128 to Bartholic, the entire disclosure of which is incorporated herein by reference. Sulfur oxide emissions in flue gases also occur in operation of coal fired boilers or any process in which sulfur-containing fuel is combusted.

Flue gas sulfur removal units have been expensive to build and are often plagued with operating and/or by-product disposal problems. Flue gas sulfur removal units fall into three general categories: wet systems, once through dry systems, and regenerable systems.

Wet flue gas sulfur removal systems consume large quantities of water, require stack gas reheat, create slurries that are dewatered in crystallizers or settling ponds, and are built employing expensive metallurgy to combat corrosion. Once through dry systems generate large quantities of solids that must be disposed. The solids handling facilities are a frequent source of problems. Regenerable dry systems are often expensive to build because they employ swing adsorbers. While one adsorber train is capturing sulfur, the other is undergoing regeneration. The valving required to effect the adsorber changes must be able to withstand the temperature and solids content of the flue gas. Solids present in the flue gas stream coat the adsorbent if it is stationary and dilute the adsorbent if it is fluidized. The net result is reduced SOx removal efficiency. Some of the regenerable systems require high purity desorption gas.

In attempts to reduce sulfur oxide (SOx) emissions from FCC units, SOx transfer additives have been injected into the circulating catalyst inventory. Similar technology has been suggested for operating selective vaporization units. See U.S. Pat. No. 4,325,815 to Bartholic.

The SOx transfer additives are fluidizable particles composed of material capable of reacting with an oxide of sulfur in an oxidizing atmosphere or an environment which is not of substantial reducing nature to form solid compounds capable of reduction in the reducing atmosphere of the FCC reactor to yield $H_2S$. Upon such reduction, the sulfur leaves the reactor as gaseous $H_2S$ and organic compounds of sulfur resulting from the cracking reaction. Since these sulfur compounds are detrimental to the quality of motor gasoline and fuel gas by-products, the catalytic cracker is followed by downstream treating facilities for removal of sulfur compounds. Thus the gaseous fractions of cracked product may be scrubbed with an amine solution to absorb $H_2S$ which is then passed to facilities for conversion to elesental sulfur, e.g. a Claus plant. The additional $H_2S$ added to the cracker product stream by chemical reduction in the reactor of the solid sulfur compounds formed in the regenerator imposes little additional burden on the sulfur recovery facilities. It has been proposed to utilize this transfer concept to remove oxides of sulfur from waste gases other than FCC flue gas by introducing such gases into the regenerator of an FCC unit operated with an inventory of SOx adsorbent and removing the sulfur from the circulating inventory in the FCC riser where a reducing atmosphere exists.

Discussion of a variety of oxides which exhibit the property of combining with SOx and thermodynamic analysis of their behavior in this regard are set out by Lowell et al., SELECTION OF METAL OXIDES FOR REMOVING SOx FROM FLUE GAS, IND. ENG. CHEM. PROCESS DES. DEVELOP., Vol. 10, No.3 at pages 384–390 (1971).

An early attempt to reduce SOx emission from catalytic cracking units, as described in U.S. Pat. No. 3,699,037, involves adding particles of a Group II metal compound, especially calcium or magnesium oxide, to a cracking unit cycle at a rate at least as great as the stoichiometric rate of sulfur deposition on the cracking catalyst, the additive preferably being injected into the regeneration zone in the form of particles greater than 20 microns. Particle size was chosen to assure a relatively long residence time in the unit. In putting the invention into practice, the Group II metal compound is recycled at least in part between the reactor and the regenerator, the remainder leaving the cycle along with catalyst fines entrained in regenerator flue gas. Subsequently it was proposed to incorporate the alkaline earth metal compound in the cracking catalyst particles by impregnation in order to minimize loss of the sulfur acceptor in the regenerator flue gases. See U.S. Pat. No. 3,835,031. This patent apparently recognizes the need for free oxygen for binding SOx with a Group II metal oxide since the equations for the reaction taking place in the regenerator is summarized as follows:

$$MgO + SO_2 + \tfrac{1}{2}O_2 = MgSO_4$$

Similar use of reactive alumina either as a discrete fluidizable entities or as a component of catalyst particles is described in U.S. Pat. Nos. 4,071,436; 4,115,250 and 4,115,251. Use of oxidants including platinum or chromium as adjuncts to alumina is suggested in these patents. Similar technology has been suggested for operating selective vaporization units. See U.S. Pat. No. 4,325,815 to Bartholic.

In the prior art techniques aforementioned, emphasis was on reversibly reacting sulfur oxides in the flue gas, and doing so while the gases were still in the regenerator. Since the sulfur loaded particles were carried to the reactor to be converted to gaseous hydrogen sulfide under the reducing atmosphere created by the cracking operation, the agents used to bind and then release sulfur were necessarily limited to those capable of doing so under the constraints of temperature and time imposed by the operation of the reactor and the regenerator.

With units operating with high sulfur feedstock, relatively large amounts of sulfur acceptors having high unit capacity to adsorb SOx are needed to accomplish reductions in sulfur oxide levels. This will result in appreciable dilution of the active catalyst in the cracking reaction cycle whether the sulfur acceptor is a part of the catalyst particles or is present as discrete entities circulated with catalyst inventory. A basic limitation is that conditions of time and temperature for operating cyclic cracking units, especially heat balanced FCC units, are geared to maximizing production of desired products and conditions that will favor this result, are by no means those that are optimum for reversibly reacting sulfur oxides in the regenerator and carrying the sulfur back to the reactor for conversion at least in part to hydrogen sulfide. Such procedures offer promise as means to reduce SOx emissions from refineries but they leave much to be desired. The technique has had limited commercial success, however, because SOx removal activity decreases rapidly with time with presently available SOx transfer agents, In U.S. Pat. No. 4,448,674 (Bartholic) there is described a system for application of the technique of binding SOx in FCC regenerator gases operated with limited air and producing a flue gas containing substantial amounts of carbon monoxide, i.e. a reducing atmosphere. In such cases, the flue gas temperature is reduced to a level at which ignition of CO is inhibited, air is injected to provide an oxidizing atmosphere and the cooled stream containing carbon monoxide and oxygen is contacted with the regenerated catalyst in a transport line under turbulent condition to promote pick-up of SOx. As described in the patent, the effluent from that contact is passed through a valve and then is sent to a CO boiler to recover the fuel value of CO by combustion at higher temperature. The agent to bind SOx is separated from gases in a precipitator and is not regenerated. To the contrary, regenerable agents are avoided because they will release oxides of sulfur in the CO boiler.

U.S. Pat. No. 4,001,375 (Longo) describes a process for the removal of sulfur oxides from gases by a regenerable sorbent composed of a cerium oxide sorbent such as cerium oxide supported on alumina. Contact of gas with sorbent is in a fixed bed. When the sorbent is loaded to a desired level it is transferred to another fixed bed in which hydrocarbon gas or hydrogen in admixture with "steam or other inert gas" is used to regenerate the sorbent. The patent teaches that during regeneration the desorbed species is initially sulfur dioxide when about 50% of the sulfur is removed, the desorbed species becomes $H_2S$. Referring to an example in the patent, it is stated that "the regeneration step is almost instantaneous relative to the slower rate of $SO_2$ pickup."

U.S. Pat. No. 4,325,811 (Sorrentino) describes a process using a regenerable sulfur oxide adsorbent to control SOx emission of the regenerator of an FCC unit in which a stream of particles including particles of the adsorbent is withdrawn from the regeneration zone and passed to a reducing zone to release adsorbed SOx. The stream of particles is then circulated back to the regeneration zone and recirculated between the reaction and the regeneration zone. In the reducing zone temperatures range from about 590° C. (1094° F.) to about 820° C. (1508° F.). The preferred reducing gas comprises a mixture of steam with hydrogen or hydrocarbon.

Illustrative of other patents relating to regenerable SOx adsorbents adapted for use in FCC units are: U.S. Pat. No. 4,153,534 (Vasalos); U.S. Pat. No. 4,153,535 (Vasalos et al); U.S. Pat. No. 4,071,436 (Blanton); U.S. Pat. No. 4,115,249 (Blanton et al); U.S. Pat. No. 4,166,787 (Blanton et al); U.S. Pat. No. 4,146,463 (Radford et al); U.S. Pat. No. 3,835,031 (Bertolacini et al); Canadian Patent 1,154,735 (Brown et al); U.S. Pat. No. 4,423,091 (Bertolacini et al); U.S. Pat. No. 4,495,304 and U.S. Pat. No. 4,495,305 (Yoo et al); U.S. Pat. No. 4,529,574 (Wang); U.S. Pat. No. 4,459,371 and U.S. Pat. No. 4,428,827 (Hobbs et al); and U.S. Pat. No. 4,381,991 (Bertolacini et al).

A recent publication of Andersson et al, "SOx Adsorption/Desorption Processes on γ-Alumina for SOx Transfer Catalyst," *Applied Catalysis*, 16 (1985) 49–58, describes thermogravimetric investigations into SOx adsorption/desorption for different conditions purported to simulate FCC operations using γ-alumina as the adsorbent. It is noted, however, that conclusions in the paper regarding desorption of SOx in an FCC riser are based on thermogravimetric desorption tests using alumina that was not coked.

A fluidized bed system for reducing NOx and SOx is described in a publication of Haslbeck et al, "The NOXSO Process Development; an Update," prepared for the Ninth EPA-EPRI Symposium on Flue Gas Desulfurization, June 4–7, 1985. A regenerable adsorbent is used.

THE INVENTION

The present invention provides a novel continuous cyclic process for removing high levels of the sulfur oxide (SOx) content of waste gases and continuously regenerating the adsorbent and recycling the regenerated adsorbent to the adsorber. The invention results from the discovery that SOx in hot waste gases wherein substantially all of the carbon is present as carbon dioxide can be removed by a dry regenerable adsorbent in the presence of free oxygen at transport velocities in a progressive flow type adsorber having an elongated chamber which is at least partially vertical or substantially vertical with either upflow or downflow or a combination of upflow and downflow such as a folded riser. This type of equipment is frequently referred to as a vertical riser. Flow of adsorbent and gas is concurrent and the adsorbent is in dilute phase during its passage through the riser at an exit superficial gas velocity above the transport velocity or above about 3.5 feet/sec. for upflow systems, preferably 30-90 feet per second, and most preferably about 40-80 feet per second, resulting in short gas/solid contact times of 30 seconds or less, preferably 5 seconds or less, and most preferably 1 second or less. The adsorbent bearing a deposit of sulfur oxides and clean hot stack gas are then immediately separated, preferably in a high efficiency solids separation device, in a manner such that the gas and adsorbent particles are never in contact with each other under conditions such that a bed of adsorbent particles is present. The outlet of the riser from which hot sulfur containing adsorbent passes is in flow communication with a desorption zone. In the desorption zone, the sulfur on the adsorbent is removed as $H_2S$ by contacting the adsorbent with hydrogen and/or light hydrocarbon gases and water vapor at elevated temperatures. The desorption vessel temperature for any specific adsorbent can be determined by means of conventional TGA (thermal gravimetric analysis) of a sulfur-laden adsorbent using hydrogen to desorb sulfur. The descrption off gas and entrained adsorbent are then separated. The desorption gas containing Hhd 2S can then be sent, after cooling, to a conventional amine treater to remove $H_2S$.

The prior art regenerable SOx adsorbent technology utilized fixed beds to remove SOx from waste gases and to regenerate the adsorbent. Efficient use of that technology called for the selection of adsorbents having maximum capacity to bind oxides of sulfur and loading the absorbent with SOx to its capacity. A similar constraint was imposed on SOx transfer agents used to reduce SOx emissions from FCC regeneration. In practice of the present invention, it is not necessary to load the adsorbent with SOx to its capacity. To the contrary, effective control of SOx emissions is achieved simply by desorbing at least as much SOx as is adsorbed and this can be accomplished with adsorbents having limited capacity to bind SOx. Furthermore, since the SOx transfer agent is not cocirculated with FCC catalysts, adsorbents can be used which could not be cocirculated with FCC catalysts because they would impair catalyst activity and/or selectivity.

A principal advantage of the present invention results from the fact that SOx is removed from waste gas in a fast fluid riser. Such a vessel is very small, compared to vessels used in prior technologies. Thus capital costs are reduced. For example, high levels of SOx removal, i.e., 95% or greater, can be achieved in 50 foot riser using a gas flow rate of 50 feet per second. In contrast, a fast fluid riser SOx adsorber downstream of an FCC regenerator operating at FCC regenerator pressure can treat the same amount of flue gas in an adsorber vessel 12.5 foot in diameter by 50 feet long as can be treated in a fluid limestone boiler which is 47 foot in diameter by 50 foot high or a SOx adsorber downstream of a power house can treat as much flue gas in a vessel $\frac{1}{4}$ of the diameter of a vessel operating at a superficial velocity of 3 ft./sec.

Other advantages of the invention include adsorbent regeneration flexibility with regard to time and temperature, flexibility in the choice of desorption gas composition, desorption of sulfur as $H_2S$, continuous adsorption of SOx and desorption of sulfur, and no production of by-products.

The process is applicable to a wide range of stationary processes in which gaseous SOx is emitted by the combustion of sulfur containing fuel including gases in which particulates are present. Examples are FCC units, smelters, heavy oil crackers, selective vaporization processes, coal or oil fired boilers and furnaces, and off-gas (tail gas) from a sulfur recovery plant.

BRIEF DESCRIPTION OF THE DRAWING

The accompanying figure is a flow scheme for a preferred form of system of the present invention which is suitable for carrying out the invention.

DESCRIPTION OF PREFERRED EMBODIMENTS

The novel process of the invention is a dry system capable of operating at various temperatures determined by the adsorption/desorption characteristics of the SOx transfer additive.

The flue gas directed to the SOx removal process of the invention can be at any temperature between 250° F. to in excess of 1700° F. Depending on the adsorbent used, the flue gas temperature will be adjusted by cooling or heating to match desired process operating temperature. Unless substantially all carbon is present as carbon dioxide, the gas should be pretreated to combust carbon monoxide by mixing with air to give excess oxygen.

The conditions in the desorber depend on the adsorbent used. There is a desorption time and temperature relationship which varies with the composition of the adsorbent. For a particular adsorbent residence time in the desorber, there is a minimum desorption temperature required to remove the sulfur deposited on the adsorbent. Preferably, desorption temperature exceeds 1050° F. The temperature of the desorbing gas can be regulated by heat exchange with the desorber off gas or clean flue gas and a trim heater. A number of light hydrocarbon gas mixtures mixed with water have been successfully used as desorb gas. Hydrogen or mixtures of hydrogen and light hydrocarbon gas are suitable desorption gases when mixed with water vapor. The desorbed off gas contains $H_2S$ which can be removed by conventional gas treating techniques such as amine treating. Desorption times exceed one second and typically are designed for three minutes or greater for stability of operation.

With this new SOx removal process, there is no large water consumption or sludge dewatering required. The adsorbents used in this new system are fluidizable materials, such as microspheres, and are readily fluidized and circulated between the adsorber and desorber. All the equipment that is operated at high temperatures is refractory-lined so that no expensive metallurgy is used.

Flue gases from systems containing particulates, such as FCC units or selective vaporization units, are preferably treated upstream of the adsorption system with solids separation devices to minimize solids from these systems accumulating in the system of the present invention and diluting the adsorbent. However, the system of the present design insures minimum dilution of adsorbent by selectively rejecting residual foreign matter or non-adsorbent particles.

In the cases of gases containing boiler fly ash or foreign material, the desorber vessel and cyclone system would be designed in a manner well-known to those skilled in the art to separate the SOx transfer material from these other particles. Separations can be based on the use of adsorbent material of different particle size and/or average bulk density. The adsorber system would utilize high efficiency solid separators to insure relatively solids-free clean adsorber flue gas. The solids removed from the flue gas are transferred to the desorber vessel, whereby a combination of elutriation and cyclone selection can be used to separate the foreign matter from the adsorbent.

With reference to the accompanying figure illustrating a preferred embodiment of the SOx treatment of the present invention, SOx-laden waste gas (A), available at a temperature between 1200° F. and 1400° F., is mixed with a regulated flow of clean adsorbent. The adsorbent and waste gas mixture and any foreign particulate matter are contacted in adsorber (B) at superficial gas velocities sufficient to provide for fast fluid transport of the adsorbent. The essentially solids free clean flue gas (D) and sulfur-laden adsorbent are separated in a high efficiency solids separation device (C). The sulfur oxide analyzer (E) is used to control the adsorbent slide valve (F) that regulates the flow of clean adsorbent to the adsorber. Sulfur containing adsorbent is then directed to the desorption vessel (G) which in this case also serves as a surge vessel to insure enough absorbent volume so that the system is stable under various process variable changes. This system could also be a riser but for stability of operation there must be a surge volume. Since the desorber gas volume is relatively low compared to the volume of flue gas this system is designed with a bed which allows for surge and elutriation of finer foreign particles. A mixture of one or more reducing gases (H), which for an ART or FCC system could be wet or dry gas, and steam or water (I) are added to the desorption vessel. Clean adsorbent from the desorption vessel is supplied to the adsorbent slide valve (F). Desorption off gas, comprising the reducing gas mixture, steam and $H_2S$, and most if not all of any foreign particulate matter entering with the waste gas and some entrained adsorbent are separated in a second solids separation device (J). The desorption off gas (K) can then be treated to remove $H_2S$.

The pressure in the desorption vessel is controlled by differential pressure control (DPC) between the adsorption vessel and the desorption vessel.

The foreign particulate matter entering with the waste gas stream will normally be of finer particle size than the adsorbent. Therefore, at the proper design superficial velocity for the desorber, essentially all the foreign matter will be elutriated from the desorber dense bed along with some adsorbent. Solids separator (J) can be designed as a two stage system to recover the majority of the coarser elutriated adsorbent and return it to the dense bed in desorber (G) through line (M) while the finer foreign particles will be recovered in the second stage high efficiency solid separators and sent to disposal through (L).

An alternative to this system would be to use a lower efficiency adsorber solids separator (C) which would allow the finer foreign particles to exit the adsorber with the clean flue gas (D) to be collected in a downstream fines removal facility such an electrostatic precipitator, scrubber or other fine particulate separation device. In this case, desorber solids separator (J) would most likely be a single stage system.

When NOx removal is desired, clean hot flue gas from (D) can be charged to a selective catalytic reduction system, such as described in U.S. Pat. No. 4,157,375 for reduction of NOx with ammonia gas. The disclosure of U.S. Pat. No. 4,157,375 is incorporated here by reference.

Typically, the operating parameters for adsorber (B) will be between 1100° F. and 1500° F. The velocity must be greater than 3-½ ft. per second or greater than transport velocity in order to assure a dilute phase operation and less than 100 ft. per second and usually will be maintained in the range of 40 to 80 ft. per second. The pressure on the adsorber will typically be between 5 and 60 psia, preferably between 14 and 45 psia and gas time will typically be 1 second or less.

The efficiency of separator (J) is not narrowly critical and all that is required is that there be a very rapid disengagement of circulating solids and vapors. Separators of this type are disclosed in U.S. Pat. Nos. 4,285,706; 4,348,215; and 4,398,932, the entire disclosures of which are herein incorporated by reference. The high efficiency separator (C) is a conventional type cyclone. It is to be understood that it can be one or a plurality of cyclones capable of removing more than 99.0%, preferably more than 99.99% of the particulates in a gas stream. Preferred separator (C) is of the multi-cyclone type, described in U.S. Pat. No. 4,285,706, the disclosure of which is incorporated herein.

A large number of regenerable oxides and combinations of oxides for reaction with SOx are described in the prior art and many can be used in accordance with the principles of this invention. In general, these compounds are stable solids at the temperature of the adsorption zone in that they do not melt, sublime or decompose at such temperatures. The usable oxides are thermodynamically capable of associating with SOx upon renewed contact between absorbent and flue gas at the temperature of such contact in an oxidizing atmosphere. The resultant sulfur compounds are capable of reduction by hydrogen and/or hydrocarbons mixed with water vapor at temperatures in the desorption zone, say 1050-1600° F., to produce $H_2S$ and thus regenerate the adsorption properties of the oxides for SOx in an oxidizing atmosphere. Nonlimiting examples of adsorbents are: alumina, magnesia, combinations of magnesia and alumina such as spinel, any of the aforementioned associated with at least one rare earth metal compound, especially cerium or lanthanum, alkalized alumina and bauxite. Adsorbents are of various effectiveness at different temperatures. While the terms "adsorbent", "adsorb" and "desorb" are used herein, the mechanism by which SOx transfer agents work is not fully understood. Thus, the terms are intended to be nonlimiting with regard to the actual mechanisms by which they operate.

The adsorbent is preferably in the form of microspheres and must have a particle size distribution suitable for fluidization. Typically, particles are in the size range of about 20 to 150 microns; average particle size is typically in the range of 60 to 80 microns. The particles are sufficiently attrition-resistant to minimize breakdown into smaller particles when they are cycled in the process. Generally, surface area of the fresh (unusued adsorbent) is 30 $m^2/g$, more usually above 100 $m^2/g$.

The following examples are given to illustrate features of the invention and are not to be construed as being limiting.

A series of tests was carried out to determine whether SOx could be effectively removed on a continuous basis from a simulated flue gas by ultrashort contact time in a fast fluid transport riser with a potentially regenerable metal/oxide SOx acceptor (sorbent) in the form of fluidizable microspheres and the sulfur loaded sorbent be cycled for regeneration, also on a continuous basis, with light hydrocarbon gases to release SOx associated with the sorbent as $H_2S$, forming a metal oxide which is recycled to the sorption zone. The metal oxide sorbent used in these tests was composed of a mixture of rare earth oxides supported on alumina, the sorbent being in the form of attrition-resistant, fluidizable microspheres.

It was found that by using contact times of only about one second in a fast fluid transport riser, 97% of the SOx contained in simulated flue gas streams containing between 1400 and 4000 ppmv $SO_2$ could be continuously removed by this adsorbent at a temperature of 1300° F. and desorbed by a reducing gas with added water vapor at temperatures above 1050° F. It was observed that addition of water vapor to the reducing gas increased regeneration of the sorbent and that SOx sorption at the short contact time was retarded by the presence of water vapor. It should be noted that a 1050° F. desorption temperature exceeds that of the riser of FCC units in which prior art attempts to regenerate SOx transfer agents were operated. Details of the test procedure and materials were as follows.

The absorbent used in the test were microspheres of alumina impregnated with a solution of lanthanum-rich mixed rare earth salts and calcined to convert the rare earth metal in the salt to oxides. The adsorbent in fresh and equilibrium state had a surface are of 196 $m^2/g$ and 77 $m^2/g$, respectively, and a pore volume in fresh and equibrium state of 0.247 and 0.245 cc/g, respectively. Chemical composition was as follows:

| Fresh | | Equilibrium |
|---|---|---|
| 22.1 | ReO (total) | 21.4 |
| 12.7 | $La_2O_3$ | 12.0 |
| 6.51 | $CeO_2$ | 6.35 |
| 2.72 | $Nd_2O_3$ | 2.93 |
| 0.05 | $Sm_2O_3$ | 0.02 |
| 0.11 | $Pr_6O_{11}$ | 0.14 |

The adsorbent was evaluated in TGA (DuPont Model 1090) equipment using a 72.44 mg sample of fresh adsorbent, sulfated to 4.5% S, heated in hydrogen flowing at 40 cc/min. with temperature being increased at the rate of 20° F./min. A graph of weight loss was automatically recorded as a function of temperature. It was found that weight loss was initiated at 505.8° C. (942° F.), peaking at 610.2° C. (1130° F.) (where there was an 11.58% weight loss). No additional weight loss was observed at temperatures in excess of 629.4° C. (1165° F.).

Flue gases were simulated by mixing water, air and nitrogen with gas from cylinders containing $SO_2$ and $CO_2$. Mixed hydrocarbon gases from cylinders were combined with water and used as desorption gas. The simulated flue gas composition when mixed with fluidizing nitrogen approximated the composition of the flue gas from a commercial selective vaporization process. Water was added to the flue gas to approximate the flue gas resulting from the combustion of coke containing 5 wt % $H_2$. The desorption gases were blended to approximate the wet gas stream of the same commercial selective vaporization unit after removal of $H_2S$, C5+ and $C_4^=$. Various amounts of water were added to the desorption gas to facilitate conversion of metal sulfides to $H_2S$ and metal oxides. The cmpositions of those gases were as follows:

| | Cylinder 1 | Cylinder 2 | Cylinder 3 |
|---|---|---|---|
| Flue Gas | | | |
| $N_2$ | — | — | — |
| $O_2$ | — | — | — |
| $CO_2$ | 97.6 | 98.5 | 99.0 |
| CO | — | — | — |
| $SO_2$ | 2.4 | 1.5 | 2.0 |
| Desorption Gas | | | |
| $H_2$ | 24.87 | 24.63 | 23.66 |
| $C_1$ | 30.67 | 32.48 | 32.86 |
| $C_2$ | 11.67 | 11.64 | 12.81 |
| $C_2^= = 16.62$ | 16.94 | 16.00 | |
| $C_3$ | 2.60 | 2.46 | 2.51 |
| $C_3^= = 9.25$ | 8.87 | 8.99 | |
| $iC_4$ | 0.21 | 0.16 | 0.17 |
| $nC_4$ | 0.48 | 0.31 | 0.38 |
| $C_4^= = 3.35$ | 2.39 | 2.43 | |
| $N_2$ | 0.28 | 0.05 | 0.12 |

A conventional circulating FCC pilot plant was modified to test the continuous SOx adsorption and sulfur desorption using the ultrashort contact time for adsorption. The modifications were made in such a way that adsorption and desorption occurrred simultaneously in different sections of the pilot plant. In using the circulating unit, a folded riser was used for short contact adsorption and the regeneration section was used for desorption.

A Tutwiler titration was used to measure SOx concentration during this test program. The Tutwiler technique is a starch iodide titration commonly used in sulfur plants to detect total sulfur in gas effluent streams. The accuracy of this technique was verified with the EPA-approved SOx detection method.

The FCC pilot plant unit that was employed had been designed to operate with continuous flow of fluidizable cracking catalyst between regenerator and reactor vessels. The unit was modified in order to operate at adsorption times of 1 second and desorption times of 15 to 40 minutes in order to study the adsorption of sulfur oxides on the adsorbent. The adsorbent circulation rates were measured by timing the increase in adsorbent level in the reactor vessel after blocking the adsorbent flow from the reactor to the regenerator vessel.

Modifications included the installation of mixing manifolds that allowed the use of different concentrations of SOx in the flue gas or different compositions of desorption gases.

During two of the tests, adsorption off gas was collected in a Mylar bag. This gas was then analyzed by the EPA-approved SOx technique. Measuresents of the SOx concentration in scrubbed flue gas as measured by the Tutwiler technique and the EPA-approved method were within 7 ppmv. Fresh starch solution for the Tutwiler tests was made daily and blank solutions were run several times during the course of daily testing. The presence of $H_2S$ in the desorption off gas was verified by Draeger tube measurements.

Typical volumetric ratio of flue gas to desorption gas to desorption water was $1 \times 10^6 : 5 \times 10^4 : 18$.

The first series of tests were run at an adsorption temperature of 1300° F. and a desorption temperature of 1300° F. Water corresponding to 5 Wt % hydrogen in coke was added to both the flue and desorption gases. Flue gas to adsorbent ratios between 1.6 and 2.4 standard ft³ per pound of adsorbent were used. Concentrations of SOx in the flue gas were between 1700 and 4300 ppmv while the SOx removal averaged 97.5%.

The second series of tests were run at adsorption temperatures of 1300° F. and desorption temperatures of 900° F. This series of tests was marked by an average SOx removal of 80%. The flue gas to adsorbent ratios were between 1.4 and 2.9 ft³ (standard) per pound of adsorbent while the SOx concentration in the flue gas averaged 1900 ppmv. During this series of tests, the water flows to the adsorber and desorber were varied. Although conclusions were based on tests using a low desorption temperature of 900° F., a decrease in water flow to either the flue gas or desorption gas was found to decrease the measured SOx removal. The sulfur level on the adsorbent increased monotonically during the course of this eies of tests to 1.1 wt. %. At this sulfur level, the desorption temperature was increased in 50° F. increments until a large increase in H₂S concentration in the desorption of gas was noticed. Flue gas containing SOx was fed to the adsorber during this sulfur strip. A large spike in H₂S was noted at a desorption temperature of 1100° F. This occurred at the same temperature on TGA traces of sulfur laden adsorbent. The sulfur content of the adsorbent was reduced to 0.09 wt. % during desorption and the SOx removal capacity of the adsorbent was restored.

The adsorbent in the unit was changed between the second and third series of tests and replaced with fresh adsorbent. The desorption temperature was increased to 1300° F. and the adsorption temperature was maintained at 1300° F. for the third series of tests. The SOx removal averaged 93%. There was a general trend of increasing SOx removal with increased water flow to the desorption section. By doubling the water rate to the desorber, the SOx removal increased from 87% to 98%.

An elementary error analysis was conducted on the results of this program. The error in SOx removal was ±2.5% at 98% removal. Some of these errors were due to the sulfur determination of the adsorbent. It was subsequently found that the repeatability of the sulfur on adsorbent results was greatly enhanced by grinding the samples and reporting the results to 3 decimal places instead of the standard 2 places.

During two consecutive tests, sufficient adsorber off gas was collected to run EPA-approved SOx determinations. The test results calculated using the Tutwiler and EPA methods were in close agreement. For the first test, the Tutwiler method yielded 100% SOx removal while the EPA method indicated 99.2% removal. During the second test, the Tutwiler sulfur removal was 99.6% while the EPA method yielded 99.8% removal.

We claim:

1. A process for removing oxides of sulfur from a waste gas which comprises one or more oxides of sulfur and substantially all of the carbon is as carbon dioxide, said process comprising:

a. continuously passing a stream of said waste gas into concurrent contact with fluidizable particles of a regenerable sulfur oxide adsorbent in a riser at a gas flow rate sufficiently high to assure fast fluid transport of said particles by said gas through said riser in a solely dilute phase entrained solids contacting zone for a period of time less than 30 seconds, at a superficial gas velocity of between 40 to 80 ft. per second and at a temperature between 250° F. to in excess of 1700° F., employing sufficient of said fluidizable particle to adsorb a desired amount of the oxides of sulfur in said gas, said adsorbent consisting essentially of particles having a particle size distribution suitabl for fluidization and being in the size range of about 20 to 150 microns with an average particle size in the range of 50 to 80 microns.

b. immediately separatiing the gas from adsorbent particles now laden with oxides of sulfur at the outlet of said riser in a high efficiency separator to recover the majority of the adsorbent particles, whereby the adsorbent particles and gas containing oxides of sulfur are in contact with each other under conditions such that a bed of adsorbent particles is present, c. continuously passing the separated fluidizable particles of adsorbent into a regeneration zone, which is in flow communication with said adsorption zone, and containing said particles of adsorbent in said regeneration zone with a stream of reducing gas containing an effective amount of water vapor for a time and at a temperature sufficient to release substantially all adsorbed sulfur oxides and form a gas comprising hydrogen sulfide, d. continuously separating said gas comprising hydrogen sulfide from the hot fluidizable particles of adsorbent now depleted of sulfur; and e. continuously circulating the fluidizable particles of adsorbent from step (d) to the riser in step (a) for contact with an incoding stream of gas containng one or more oxides of sulfur.

2. The process of claim 1 wherein step (c) is carried out at a temperature in excess of 1050° F.

3. The process of claim 1 wherein the separation in step (b) is carried out in a cyclone.

4. The process of claim 1 wherein contact between adsorbent and waste gas in step (a) is at a superficial gas velocity below 100 ft. per second and for a period of time of five seconds or less and contact between adsorbent and desorbing gas in step (c) is for a gas time greater than 1 second.

5. The process of claim 4 wherein the temperature in step (c) is above 1050° F.

6. The process of claim 5 wherein the temperature in step (a) is 1150° F. or higher.

7. The process of claim 1 wherein said adsorbent comprises at least one rare earth compound supported on particles comprising alumina.

8. The process of claim 1 wherein said reducing gas comprises hydrogen.

9. The process of claim 1 wherein said reducing gas comprises a hydrocarbon.

10. The process of claim 1 wherein more than 95% of the sulfur oxides are removed from said gas.

11. The process of claim 1 wherein more than 97% of the sulfur oxides are removed from said gas.

12. The process of claim 1 wherein said adsorbent comprises at least one rare earth compound supported on particles comprising alumina and contact in said riser in step (a) is at a temperature in the range of about 250° F. to 1400° F. and step (c) is carried out at a temperature of at least 1050° F.

13. The process of claim 12 wherein the temperature in step (a) is 1150° F. or higher.

14. The process of claim 1 wherein said waste gas arises from the combustion of carbonaceous fuel.

15. The process of claim 1 wherein said waste gas is from a smelting operation.

16. The process of claim 1 wherein said waste gas is a tail gas from a sulfur plant.

17. The process of claim 1 wherein said waste gas contains particulates which are separated from the gas at the outlet of said riser in a two stage separation device.

18. The process of claim 17 wherein the first stage recovers the majority of the adsorbent material and returns it to the circulating process and the second stage is an electrostatic precipitator, scrubber or other fine particle retention device for retention of the entering particles before exhaust to the atmosphere.

19. The process of claim 1 wherein said waste gas contains particulates from an upstream unit and these particles are separtted from the absorbent particles in step (b) by using an absorbent material of different particle size range, average bulk density or both, and a two stage separation device in step (b) recovers the majority of the absorbent material in the first stage and returns it to the circulating process and reject the entering particulates to be recovered in the second stage system.

20. The process of claim 1 wherein the gas separated from adsorbent particles in step (b) is treated for removal of NOx by selective catalytic reduction.

* * * * *